April 19, 1927.
R. J. O. SIMPSON
CYLINDER GAUGE
Filed March 8, 1923　　2 Sheets-Sheet 1
1,625,401
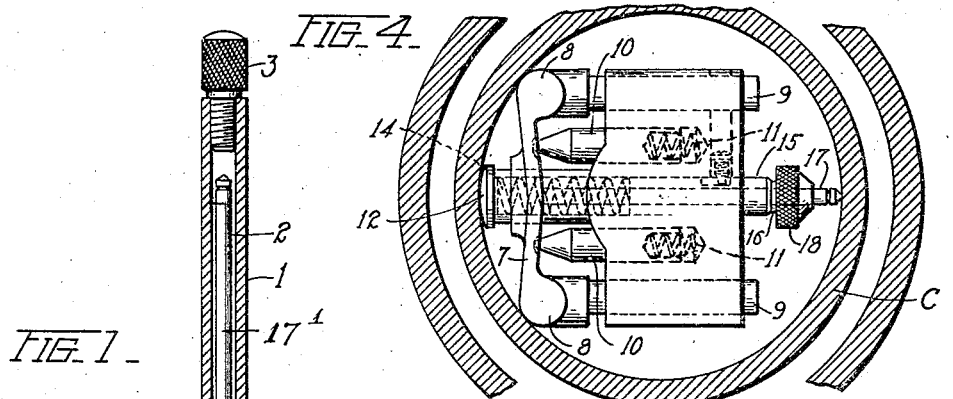
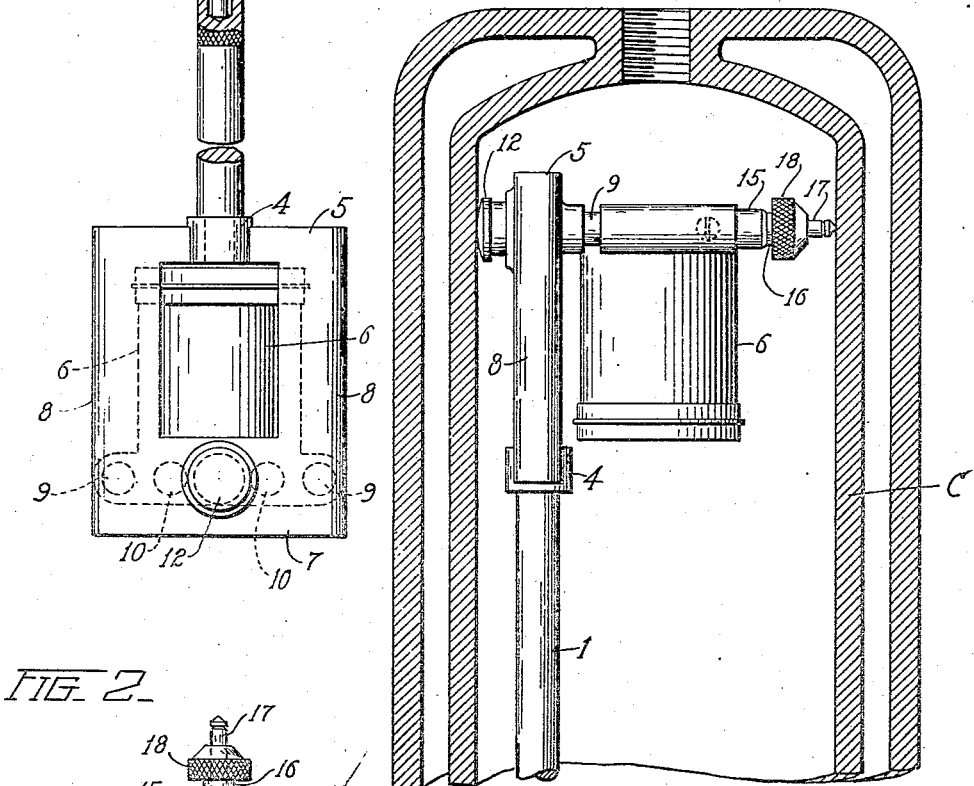
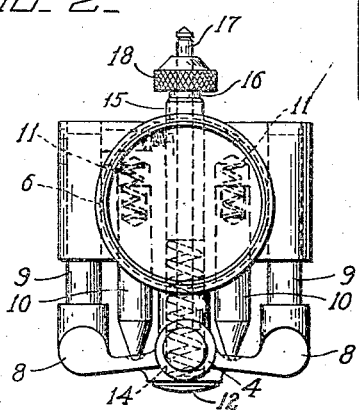
Inventor:
ROBERT J. O. SIMPSON
by *Ellis Spach Jr.*
Atty.

April 19, 1927.
R. J. O. SIMPSON
CYLINDER GAUGE
Filed March 8, 1923    2 Sheets-Sheet 2
1,625,401
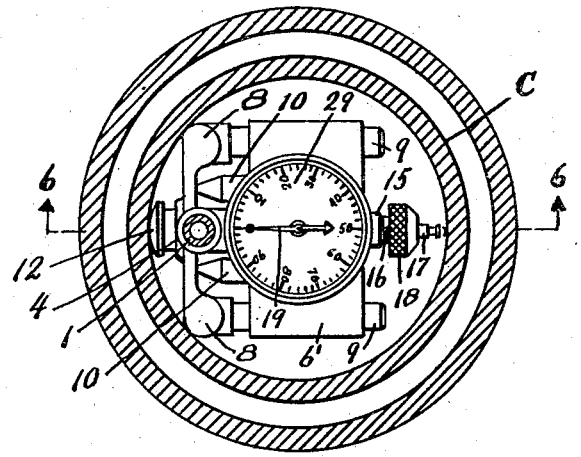
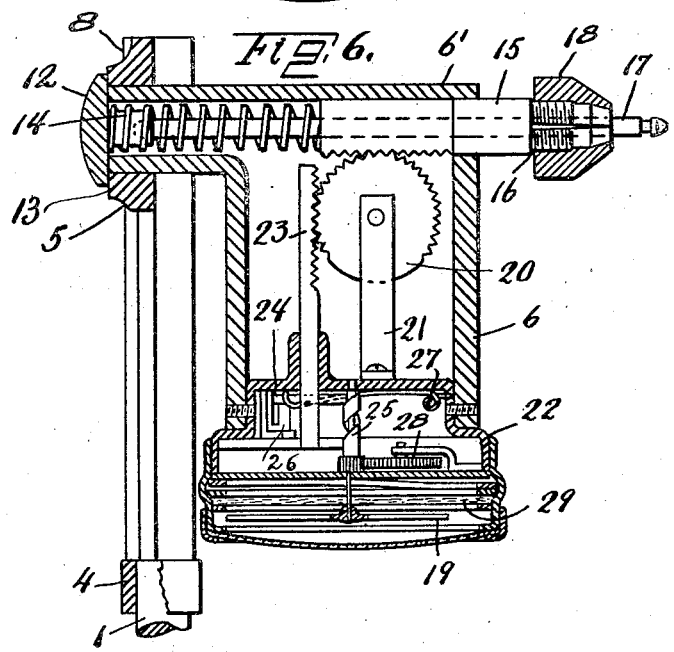
Inventor.
Robert J. O. Simpson,
by Ellis Spear Jr.
Attorney.

Patented Apr. 19, 1927.

1,625,401

UNITED STATES PATENT OFFICE.

ROBERT J. O. SIMPSON, OF ATHOL, MASSACHUSETTS, ASSIGNOR TO THE L. S. STARRETT COMPANY, OF ATHOL, MASSACHUSETTS, A CORPORATION OF MASSACHUSETTS.

CYLINDER GAUGE.

Application filed March 8, 1923. Serial No. 623,653.

This invention relates to dial indicators, and particularly to an indicator for gauging the cylinders of an internal combustion engine to determine the variation, if any, in the cylinder bore and visually indicate to the car owner that the cylinders of his engine require regrinding.

My present invention involves certain improvements upon and refinements over the cylinder gauge disclosed in application, Serial Number 583,159, filed August 21, 1922, to which reference is made as illustrating a gauge of the general type involved herein.

The construction and operation of my gauge, together with a selected embodiment which well illustrates the principles involved, is described and shown in the accompanying specification and drawings throughout which like reference characters are applied to indicate corresponding parts, and the characteristic features of novelty are particularly pointed out in the appended claims.

In the drawings:

Fig. 1 is an elevation partly in section of a cylinder gauge in accordance with my present invention as viewed from the rear of the sled or frame piece.

Fig. 2 is a plan view thereof.

Fig. 3 is a view at right angles to Fig. 1 and illustrating the manner of gauging a cylinder bore, Fig. 4 is a plan view of Fig. 3, Fig. 5 is a transverse section through the cylinder with my improved gauge positioned therein and viewing the gauge from the open end of the cylinder, and Fig. 6 is a section on the line 6—6 of Fig. 5.

I have indicated at 1 the handle of a dial indicator in accordance with my invention. The upper end of the handle is preferably externally milled as shown in Fig. 1 to provide a convenient finger hold. The handle is hollow for a portion of its length to constitute a receptacle 2 for an extra gauging stem 17' and at its upper end is tapped and threaded to receive a cap screw 3 which closes the outer end of the hollow receptacle.

The lower end of the handle 1 is threaded in a bearing 4 formed centrally of the upper cross piece of a sled or open rectangular frame 5 upon which the dial indicator 6 is mounted for sliding movement in a horizontal plane. The lower cross piece of the sled is indicated at 7 and the vertical uprights connecting said cross pieces are indicated at 8. These uprights are rounded on a radius substantially equal to the curvature of the smallest cylinder bore to which the indicator is adaptable.

Projecting horizontally from the uprights is a pair of spaced guide posts 9 which are disposed through horizontal sockets in the base 6' of the dial indicator. Fixed in the lower cross piece 7 of the sled adjacent the guide posts 9 is a pair of spring plungers 10, the springs for which are indicated at 11.

Slidable centrally through the lower cross piece of the sled is a headed contact stud 12 which is formed integral with the base of the dial indicator. Confined within said casing base is a coil spring 14 which abuts the stud 12 at one end and at its other end abuts a horizontally sliding rack bar 15 which is guided in the base of the dial indicator casting and is alined with the stud 12. At its outer end the rack bar 15 is provided with a split chuck 16 within which a contact stem 17 is adapted to be inserted and clamped by a clamp nut 18. The reciprocation of the rack bar 15 is transmitted to the pointer 19 of the dial indicator as rotary motion by means of a gear segment 20 meshing with the teeth of the rack bar and journaled in a split bearing 21 fast to the under side of the indicator casing 22. The gear segment 20 in turn meshes with the teeth of a vertically disposed rack bar 23 mounted in said casing 22 and provided with a transverse pin 24, one end of which is disposed in a spiral groove cut in the pointer barrel 25 and the opposite end of which is guided in a guide 26 mounted on the casing 22. The movement of the rack bar 23 towards the dial is resisted by a coil spring 27 anchored within said casing and engaging the pin 24 at one end.

The rotation of the barrel 25 is transmitted to the pointer 19 through a gear train 28 whereby to rotate said pointer over the graduated dial 29 of the indicator.

In use, a contact stem 17 of the approximate proper length for the diameter of the cylinder C to be tested is clamped within the chuck and the gauge is inserted into the bore of the cylinder as shown in Fig. 3 substantially completely to the bottom thereof, the rounded edges of the uprights of the sled permitting the sled to snugly bear against the curved inner face of the cylinder wall.

The tension of the spring 14 is greater than the combined tension of the springs in the plungers 10, permitting the dial indicator to be moved inwardly towards the sled a slight distance if the distance between the end of the contact stem 17 and the contact 12 is slightly greater than the diameter of the cylinder bore. When the springs expand, the dial indicator will be positioned vertically at the desired level within the cylinder, and will remain at such elevation until released. This preliminary adjustment is ineffective upon the gauging operation itself, since any movement of the pointer of the dial indicator over the dial during the preliminary adjustment of the device to the cylinder may be taken care of by resetting the pointer at zero before the actual calibrating of the cylinder has commenced. In such resetting operation the dial is turned relative to the pointer. For this purpose the dial is rotatably mounted upon the dial casing and the tranparent cover therefor is provided with a milled edge whereby it may be conveniently grasped and rotated.

The cylinder may now be calibrated throughout its entire length and circumference by moving the gauge back and forth within the cylinder. In such movement the rounded contact ends of the studs 12 and stem 17 bear against the inner face of the cylinder wall at diametrically opposite points and through the horizontal rack bar 15 and connections 20, 23, 24, 25, gear train 28 and pointer 19 instantly register upon the dial any irregularities which may exist in the cylinder.

When a variation is indicated upon the dial, the reading is first noted, after which the gauge is removed from the cylinder and the rounded ends of the contact stud 12 and contact stem 17 are placed between the jaws of an outside micrometer and the micrometer spindle rotated until the pointer of the dial indicator again registers the same reading on the dial as it did when the gauge was inserted with the cylinder.

When the pressure upon the coil springs is relieved, the said springs react to return the dial indicator casing to its normal position. The movement of said casing in this direction is limited by the contact of the shouldered head of the stud 12 with the bearing 13 for said stud. By adjusting the contact stem 17 within the chuck according to the approximate diameter of the cylinder to be gauged, the device may be accommodated to a wide varying range of cylinder diameters.

When the cylinder diameter is unusually large, this stem may be unclamped and the extra stem 17' contained in the hollow outer end of the handle may be substituted therefor. This adapts the device to practically every usual size of cylinder.

Various modifications in the form and construction of my device may obviously be resorted to without departing from the spirit of my invention if within the limits of the appended claims.

What I therefore claim and desire to secure by Letters Patent is:

1. A cylinder gauge comprising a frame, a dial indicator having a pointer and yieldably mounted thereon for sliding movement relative thereto, a contact stud carried by said indicator and movable through said frame into contact with the cylinder wall, an intermediate member alined with said stud and slidable within the dial indicator, a spring interposed between said stud and the inner end of said member, a chuck mounted on the outer end of said member, a contact stem clamped within said chuck and adapted for contact with the cylinder wall at a point substantially diametrically opposite the point of said stud contact, and motion transmitting connections between said intermediate member and the pointer of the dial indicator for converting the reciprocation of said member into rotary motion applied to said pointer.

2. A cylinder gauge comprising a frame, a pair of spaced guide posts projecting from said frame, a dial indicator having a pointer and slidable on said posts, a pair of spaced plungers projecting from said frame between said guide posts and disposed within said dial indicator, springs pressing said plungers and normally maintaining the dial indicator away from said frame, a contact stud carried by said dial indicator and movable through said frame into contact with the cylinder wall, an intermediate member alined with said stud and slidable within the dial indicator, a spring interposed between said stud and the inner end of said member, a chuck mounted on the outer end of said member, a contact stem clamped within said chuck and adapted for contact with the cylinder wall at a point substantially diametrically opposite the point of said stud contact, and motion transmitting connections between said intermediate member and the pointer of the dial indicator for converting the reciprocation of said member into rotary motion applied to said pointer.

3. A cylinder gauge comprising an elongated frame adapted to be positioned longitudinally within a cylinder and having a bearing for a contact stud, a pair of spaced guide posts projecting from said frame, a dial indicator having a pointer and slidable on said guide posts, a pair of spaced plungers projecting from said frame between said guide posts and disposed within the dial indicator, springs pressing said plungers and normally maintaining the dial indicator away from said frame, a contact stud projecting from the dial indicator between said pair of spring plungers and disposed through said bearing of said frame for contact with the cylinder wall, a rack bar alined with said stud and slidable through the indicator, a coil spring interposed between said stud and rack bar, a contact stem alined with said rack bar and adapted for contact with the cylinder wall at a point substantially diametrically opposite the point of said stud contact, and motion transmitting connections between said rack bar and the pointer of the dial indicator for converting the reciprocation of said rack bar into rotary motion applied to said pointer.

4. A cylinder gauge comprising an elongated bearing member adapted to be positioned longitudinally within a cylinder and having a central bearing for a contact stud, a pair of spaced guide posts projecting from said frame, a dial indicator having a pointer and slidable on said guide posts, a pair of spaced plungers projecting from said frame between said guide posts and disposed within the base of the dial indicator, coiled springs abutting said plungers and normally maintaining the dial indicator away from said frame, a contact stud integral with the dial indicator between said pair of spring plungers and disposed through the bearing of said frame for contact with the cylinder wall, said stud having a shouldered head adapted to contact said bearing to limit the movement of said dial indicator away from said frame, a rack bar alined with said stud and slidable through the indicator, a coil spring interposed between said stud and rack bar, a contact stem alined with said rack bar and adapted for contact with the cylinder wall at a point substantially diametrically opposite the point of said stud contact, and motion transmitting connections between said rack bar and the pointer of the dial indicator for converting the reciprocation of said rack bar into rotary motion applied to said pointer.

5. A cylinder gauge comprising an elongated bearing member adapted to be positioned longitudinally within a cylinder and having a bearing for a contact stud, a pair of spaced guide posts projecting from said frame, a dial indicator having a pointer and slidable on said guide posts, a pair of spaced plungers projecting from said frame between said guide posts and disposed within the dial indicator, coiled springs abutting said plunger and normally maintaining the dial indicator away from said frame, a contact stud integral with the dial indicator between said pair of spring plungers and disposed through the bearing of said frame for contact with the cylinder wall, a rack bar alined with said stud and slidable through the indicator and provided at its outer end with a chuck, a contact stem clamped in said chuck and adapted for contact with the cylinder wall at a point substantially diametrically opposite the point of said stud contact, a coil spring interposed between said stud and rack bar, and motion transmitting connections between said rack bar and the pointer of the dial indicator for converting the reciprocation of said rack bar into rotary motion applied to said pointer.

6. A cylinder gauge comprising a handle, a frame at one end of said handle and having a bearing for a contact stud, a dial indicator having a pointer and yieldably mounted for sliding movement relative to said frame and having a stud movable through said bearing of the frame for contact with the cylinder wall, an intermediate member alined with said contact stud, a spring interposed between said member and stud, a contact stem alined with said intermediate member and adapted for contact with the cylinder wall at a point substantially diametrically opposite the point of said stud contact, and motion transmitting connections between said member and the pointer of said dial indicator for converting the reciprocation of said member into rotary motion applied to said pointer.

7. A cylinder gauge comprising a frame adapted to be positioned within a cylinder and having a pair of spaced guide posts projecting therefrom, a dial indicator having a pointer and yieldably mounted upon said guide posts for sliding movement transversely of said frame, a pair of spaced plungers projecting from said frame adjacent said guide posts, springs interposed between said plungers and dial indicator normally maintaining the dial indicator away from said frame, a cylinder contact mechanism associated with said dial indicator and motion transmitting connections between said contact mechanism and the pointer of the dial indicator.

8. A cylinder gauge comprising a frame adapted to be positioned within a cylinder and having a pair of spaced guide posts projecting therefrom, a dial indicator having a pointer and yieldably mounted upon said guide posts for sliding movement transversely of said frame, a pair of spaced plungers projecting from said frame between and parallel to said guide posts, springs interposed between said plungers and dial indicator normally maintaining the dial indicator away from said frame, a cylinder wall contact associated with said frame and a cylinder wall contact associated with said dial indicator, and motion transmitting connections between one of said contacts and the pointer of the dial indicator.

9. A cylinder gauge, comprising an elongated frame adapted to be positioned longitudinally within a cylinder for contact with the walls thereof along spaced substantially parallel lines of bearing, a dial indicator having a pointer and mounted on said frame for sliding movement transversely relative thereto, a contact member carried by said dial indicator projecting through said frame for contact with the cylinder wall intermediate of the said lines of frame contact and perpendicularly thereto, a chuck associated with said dial indicator, a contact member detachably clamped within said chuck in alinement with said first-named contact member and adapted for contact with the cylinder wall diametrically oppositely thereto, and motion transmitting connections between one of said pair of alined contact members and the pointer of the dial indicator.

10. A cylinder gauge comprising an elongated frame adapted to be positioned within a cylinder, for contact with the walls thereof along spaced parallel lines of bearing, a dial indicator having a pointer and yieldably mounted on said frame for sliding movement transversely relative thereto, a chuck associated with said dial indicator, a contact stem detachably clamped within said chuck and adapted for contact with the cylinder wall transversely of the plane of said lines of frame contact and perpendicular thereto, and motion transmitting connections between said stem and the pointer of the dial indicator.

In testimony whereof I affix my signature.

ROBERT J. O. SIMPSON.